Feb. 23, 1926. 1,573,804
C. W. R. CAMPBELL ET AL
MOVING LENS CINEMATOGRAPH APPARATUS
Filed Dec. 20, 1923
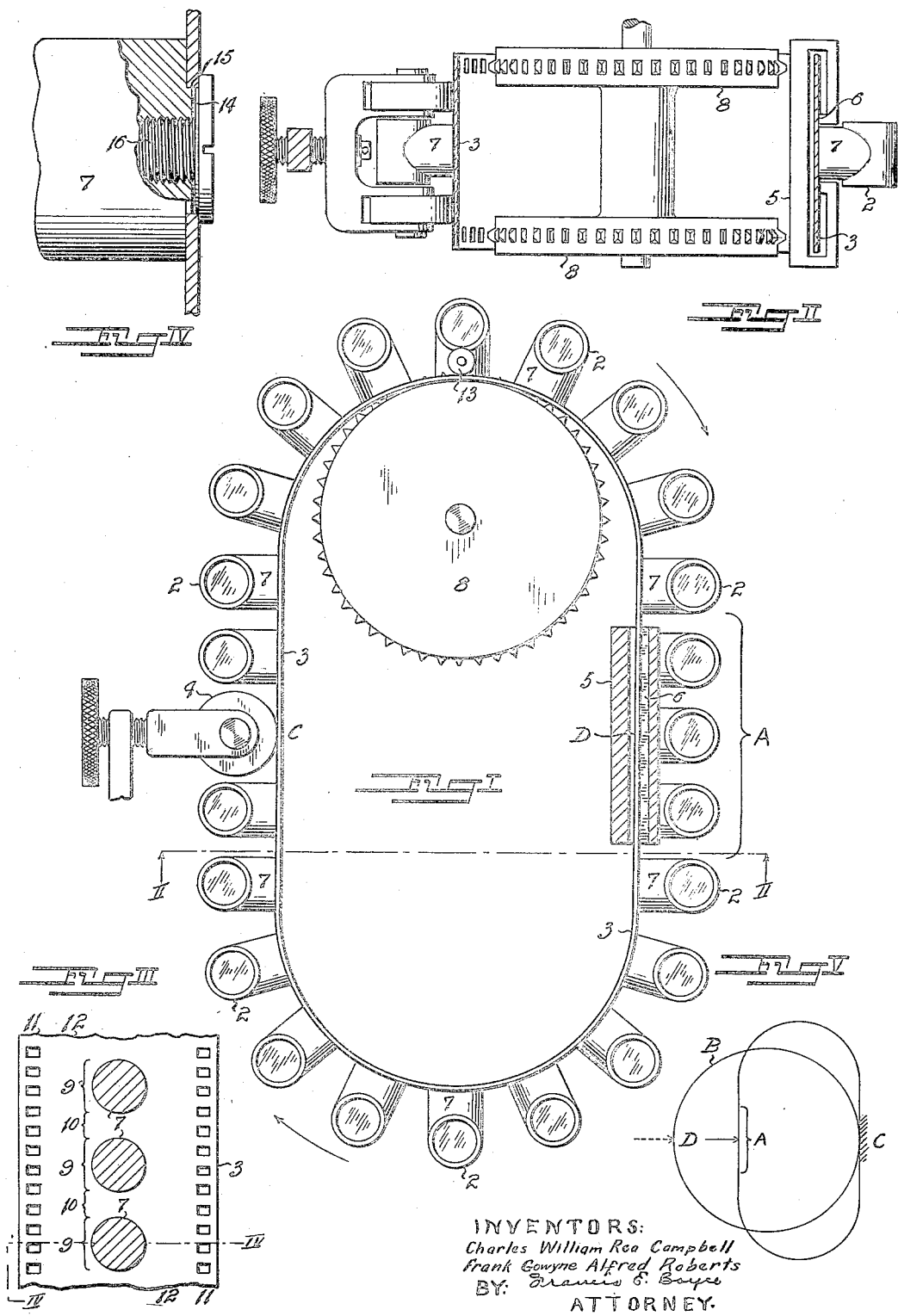
INVENTORS:
Charles William Rea Campbell
Frank Gowyne Alfred Roberts
BY: Francis E. Boyce
ATTORNEY.

Patented Feb. 23, 1926.

1,573,804

UNITED STATES PATENT OFFICE.

CHARLES WILLIAM REA CAMPBELL, OF DRIEHOEK, AND FRANK GOWYNE ALFRED ROBERTS, OF JOHANNESBURG, TRANSVAAL, SOUTH AFRICA.

MOVING-LENS CINEMATOGRAPH APPARATUS.

Application filed December 20, 1923. Serial No. 681,683.

*To all whom it may concern:*

Be it known that CHARLES WILLIAM REA CAMPBELL, British subject, and FRANK GOWYNE ALFRED ROBERTS, British subject, residing at care of Victoria Falls & Transvaal Power Co. Ltd., Driehoek, Transvaal, and "Stoneycroft," corner of 3rd and 6th Avenues, Rosebank, Johannesburg, Transvaal, Union of South Africa, respectively, have invented certain new and useful Improvements in Moving-Lens Cinematograph Apparatus, of which the following is a specification.

The present invention has reference to cinematograph apparatus of the kind employing an endless moving series of connected lenses, which, for instance, co-operate with a continuously moving film and an optical correcting means as described in the specification of our prior Patent No. 1,486,362.

The invention provides a resilient metallic or like band on which the lens series is mounted and which is arranged to be guided in a straight path, during exposure, stably and with the minimum of friction.

The invention also provides a lens band with lenses fixed thereon at intervals which can effectively engage a driving or supporting drum having a circular periphery.

The invention is illustrated in the accompanying drawings in which:—

Fig. I is a front view of a lens series for a projector or camera.

Fig. II is a plan sectioned on II—II Fig. I.

Fig. III is a front view of the lens band.

Fig. IV is an enlarged cross section through IV—IV Fig. III.

Fig. V is a diagram.

2 indicates an endless series of lenses which it is desired to move through a zone A with true rectilinear motion and at a definite linear speed. According to this invention the lenses 2 are for this purpose mounted upon an endless thin and resilient band 3, conveniently a metal band.

In order to produce the truly rectilinear zone A of the band where the lenses are to be operative, with reasonable bending force on the band and resulting friction, advantage is taken of the fact that if an endless thin spring band of initially circular form B, Fig. V has one part of it constrained, for instance, at the point C, and another point D of it is pressed inwards, a position is reached where there forms about the pressed-in point a zone A which is straight for some distance and gradually merges into the curved remainder of the band; the extent of the zone depending upon the length and stiffness of the band.

This arrangement is carried out in the construction shown by placing at the point C the roller 4, which may be adjustable, and making the point D the centre point of a gate guide 5.

The active surface 6 of the gate guide touches the outside face of the band, no corresponding inner guide being necessary. Said surface 6 is preferably formed as two narrow strips (Fig. II) touching the band immediately on either side of the lens mounts 7 arranged in the centre of the band, the borders of the band being left free in the gate guide.

By arranging the points C and D at diametrically opposite points of the band the flattening of the band is effected with the least possible force and resulting friction. The relative positions of the constraining points may however be varied and the point C may be duplicated; but the nearer the point D is to the other constraining point or points the more force is necessary to flatten the band and the less the length of the flattened zone.

The resilience of the band holds it in good contact with the guide surface 6 and resists any force tending to displace the band from that position, so that the lenses in the zone A are very stably held in a straight line.

A sprocket drum 8 is arranged to engage part of the curved section of the band for supporting and driving the same.

The attachment of the rigid lens mounts 7 at intervals along the band produces in the band alternate rigid sections 9 and non-rigid sections 10 so that the band in passing around the drum 8 necessarily assumes a roughly polygonal form. The mounts 7 are accordingly attached at the centre of the band as shown in Fig. III and the band is made of such width in relation to its thickness that the borders 11 of the band can, in passing around the drum, retain a circular form; the intermediate widths 12 of the band resiliently buckling to accommodate the circular and the polygonal forms.

The drum 8 engages the band only at the borders 11 and is made of large diameter in order to minimize the difference between the circular and polygonal forms of the band.

A band arranged as described and engaging with three pairs of sprockets on the drum 8 by a retaining roller 13 is amply rigid in the plane of its edge and requires no edge guiding.

The lens mounts 7 may be fixed to the band as shown in Fig. IV by forming at the base of each a circular spigot 14 which passes into a hole 15 in the band and is there secured by a screw 16.

A band embodying the above features has operated successfully when constructed and arranged as follows:—

| | |
|---|---|
| Material | Spring brass. |
| Thickness | .016 inch. |
| Width | 2 inches. |
| Length | 17.76 inches. |
| Length of gate guide | 2.25 inches. |
| Number of lenses on band | 24. |
| Driving drum | 72 mm. diameter with 48 sprocket teeth. |

We claim:—

1. The combination of a thin spring band of naturally circular form, a series of lens mounts thereon, means constraining one part of the band against outward movement, means constraining the band at another part by inward pressure only to form a natural straight section at said other part, and means for driving the band.

2. The combination of a thin resilient band of naturally circular form, a series of lens mounts thereon, means pressing said band inwardly at substantially diametrically opposite points to form a natural straight section, and means for driving the band.

3. The combination of a thin resilient band of naturally circular form, a series of lens mounts thereon, a rectilinear guide engaging the outside of the band, means constraining the opposite side of the band by inward pressure to cause the same to conform to the rectilinear guide, and means for driving the band.

4. The combination of a thin resilient band of naturally circular form, a series of lens mounts thereon, means constraining part of the band against outward movement, means constraining another part of the band by inward pressure to shape the band into a straight part and curved parts, and a driving drum engaging a curved part of the band.

5. The combination of a thin resilient endless band, a series of lens mounts thereon, a drum engaging the border area of the band, a linear guide at another part of the band, said guide engaging a limited area of the band adjacent to the lens mounts and leaving the border area unconstrained.

6. The combination of a thin endless band, a series of lens mounts thereon, a sprocket drum engaging only the border area of the band, and a linear guide engaging only the inner area of the band.

7. The combination of a thin endless band, a series of lens mounts arranged at intervals along the centre strip thereof thereby rendering inflexible successive portions of said strip and leaving flexible portions of the strip between the inflexible portions, the borders of the band being unoccupied by the mounts and the band being sufficiently flexible transversely to permit the borders to flex to circular form whilst the centre strip flexes as necessitated by its inflexible portions, and a drum having a circular periphery engaging only the borders of the band.

8. The combination of a thin endless band, a series of lens mounts arranged at intervals along a strip comprising part of the width of the band and thereby rendering inflexible successive portions of said strip and leaving flexible portions between said inflexible portions, a further part of the width of the band being unoccupied by the lens mounts, and the band being sufficiently flexible transversely to permit said further part of the width to flex to circular form whilst the strip holding the lens mounts flexes to the form necessitated by its inflexible portions and a drum having a circular periphery which engages only that portion of the width of the band capable of assuming the circular form.

9. The combination of a thin endless band, a series of lens mounts arranged at intervals along a strip comprising only part of the width of the band thereby rendering inflexible successive portions of said strip and leaving flexible portions between said inflexible portions, the remaining width of the band being unoccupied by the lens mounts and the band being of such flexibility transversely that when the band is flexed, the form assumed by the unoccupied width of the band is not materially influenced by the form imposed on the mount-containing strip by reason of its inflexible portions.

10. The combination of a thin endless spring band, a series of lens mounts arranged at intervals along a strip comprising only part of the width of the band thereby rendering inflexible successive portions of said strip and leaving flexible portions between said inflexible portions, the remaining width of the band being unoccupied by the lens mounts and the band being of such flexibility transversely that when the band is flexed, the form assumed by the unoccupied width of the band is not materially influenced by the form imposed on the mount-containing strip by reason of its inflexible portions.

11. The combination of an endless band of thin spring metal of such relative width and thickness that the borders can curve to circular form whilst the centre strip assumes a roughly polygonal form, a number of lens mounts fixed at intervals to the centre strip and thereby rendering inflexible successive portions of said strip, means constraining said band into a form comprising two opposite straight lengths and curved upper and lower ends, said means comprising a linear guide touching the outside of one straight strip, and a member touching the outside of the other straight strip, and a drum having a cylindrical periphery engaging only the edges of the band in the upper curved portion.

In testimony whereof we have hereunto set our hands.

CHARLES WILLIAM REA CAMPBELL.
FRANK GOWYNE ALFRED ROBERTS.